(No Model.)
F. J. KALDENBERG.
TOILET MIRROR.
No. 244,617. Patented July 19, 1881.
Fig. 1.
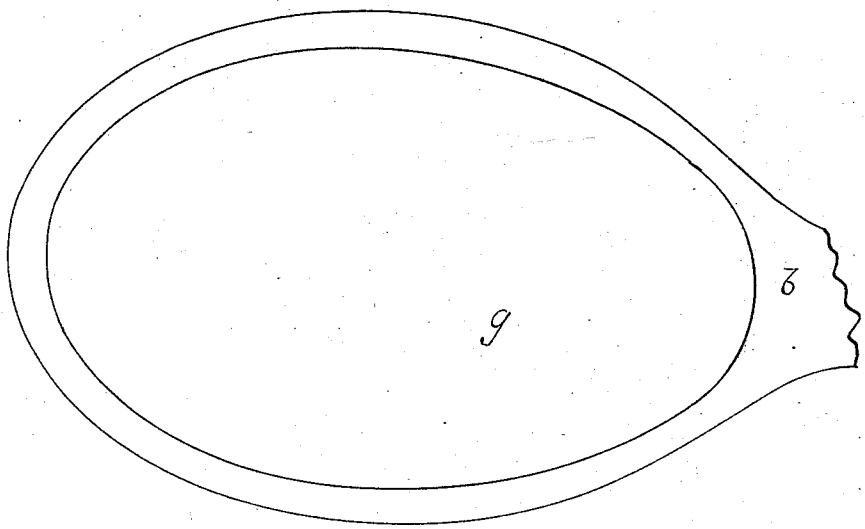
Fig. 2.
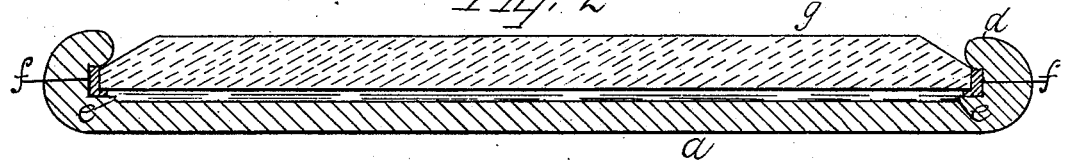
Fig. 3.
Witnesses:
William O. Denis.
Robert Macfarlane
Inventor:
Frederick Julius Kaldenberg
By K. Newell
his atty

UNITED STATES PATENT OFFICE.

FREDERICK J. KALDENBERG, OF NEW YORK, N. Y.

TOILET-MIRROR.

SPECIFICATION forming part of Letters Patent No. 244,617, dated July 19, 1881.

Application filed May 23, 1881. (No model.)

*To all whom it may concern:*

Be it known that I, FREDERICK JULIUS KALDENBERG, a citizen of the United States, residing at New York, in the county and State of New York, have invented certain new and useful Improvements in the construction of Toilet-Mirrors, of which the following is a specification.

My invention relates to that class of mirrors which are portable, such as hand-mirrors and those mounted in a swinging frame, and the object of my improvement is to provide means whereby the mirror-glass can be secured within the frame without undue pressure upon the rim of the frame, and also to afford facilities for its easy and safe insertion and removal without injury to either the glass or the rim of the frame. To obtain these objects with as little labor and with as great a degree of security as possible is the purpose of my present invention.

In the drawings serving to illustrate my invention, Figure 1 is a view from the front of a toilet-mirror embodying my improvement. Fig. 2 is a sectional view through line $x$ $x$ of Fig. 1, and Fig. 3 is a side view of the rubber removed.

$a$ represents the frame proper of a toilet-mirror, and $b$ the handle thereof.

$c$ is the rim portion of the frame, which is bent over considerably, so as to form an inward overhanging lip, $d$. Within the rim is provided on the vertical sides a shoulder, $e$, which may extend entirely or only partially around the inner sides of the frame.

$f$ is a piece of elastic material of suitable width and thickness to permit it to be inserted between the shoulder $e$ and lip $d$, against which the peripheral edges of the mirror-glass $g$ press when it is inserted in its proper position. The glass is supported on the shoulder $e$, and its periphery becomes embedded in the rubber, so that however much the rim of the frame may shrink or contract the elastic material will prevent it from coming in contact with the unyielding surface of the glass, and will give it room for such shrinkage by its yielding when pressure is brought upon it. I have found it better in practice to use rubber as the material for this purpose, and to provide it with a small groove, as shown at $h$ in Fig. 3. This permits of the edge of the glass being pressed in with greater ease, and insures a more secure fastening within the frame. It also affords a better protection for the corners of the glass, and prevents any danger of friction between the periphery of the glass and lip of the rim if the mirror should be roughly handled or accidentally dropped. The back of the glass is protected in the usual manner, by inserting several folds of light soft paper or equivalent material behind it, and the dark shadow of the glass through the transparent ivory at the back is also prevented by this means. After placing the rubber on the shoulder beneath the lip of the rim the glass can be readily inserted by pressing one portion of its edge into the elastic material, when the remainder can be sprung beneath the lip and the reaction of the rubber will cause the glass to adjust itself so that a uniform pressure will be brought upon its entire periphery, and it will be securely fastened in the frame.

What I claim as new, and desire to secure by Letters Patent, is—

The combination, in a toilet-mirror, of a frame with a rim and an overhanging lip, the said rim having a shoulder on its vertical sides with a beveled mirror-glass and with rubber or other elastic material arranged between the said lip and the shoulder and inclosing the peripheral edge of the glass, substantially as and for the purpose set forth.

FRED. JULIUS KALDENBERG.

Witnesses:
F. R. KALDENBERG,
LEWIS P. WARTH.